(12) United States Patent
Schweizer et al.

(10) Patent No.: US 8,389,040 B2
(45) Date of Patent: Mar. 5, 2013

(54) PRODUCTION OF ACID SOLUBLE SOY PROTEIN ISOLATES ("S700")

(75) Inventors: Martin Schweizer, Winnipeg (CA); Kevin I Segall, Winnipeg (CA); Brent E Green, Warren (CA); Sarah Medina, Winnipeg (CA); Brandy Gosnell, Winnipeg (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 330 days.

(21) Appl. No.: 12/828,199

(22) Filed: Jun. 30, 2010

(65) Prior Publication Data
US 2010/0330248 A1 Dec. 30, 2010

Related U.S. Application Data

(60) Provisional application No. 61/213,648, filed on Jun. 30, 2009.

(51) Int. Cl.
*A23J 1/00* (2006.01)
(52) U.S. Cl. .................. 426/656; 426/634; 530/412
(58) Field of Classification Search .............. None
See application file for complete search history.

(56) References Cited

U.S. PATENT DOCUMENTS

| | | | |
|---|---|---|---|
| 3,736,147 | A | 5/1973 | Iacobucci et al. |
| 4,169,090 | A | 9/1979 | Murray et al. |
| 4,208,323 | A | 6/1980 | Murray et al. |
| 4,889,921 | A | 12/1989 | Diosady et al. |
| 5,844,086 | A | 12/1998 | Murray |
| 6,005,076 | A | 12/1999 | Murray |
| 7,465,470 | B2 | 12/2008 | Saito et al. |
| 2007/0065567 | A1* | 3/2007 | Segall et al. .......... 426/634 |

FOREIGN PATENT DOCUMENTS

| | | |
|---|---|---|
| CA | 2445147 | 11/2002 |
| CA | 2564400 | 11/2005 |
| EP | 0 752 212 | 1/1997 |
| WO | WO 2010/045727 | 4/2010 |
| WO | WO 2010/083612 | 7/2010 |
| WO | WO 2010/091509 | 8/2010 |
| WO | WO 2010/091511 | 8/2010 |

OTHER PUBLICATIONS

Friedman et al. ("Nutritional and Health Benefits of Soy Proteins" in Journal of Agricultural and Food Chemistry, Mar. 2001, vol. 49, No. 3, p. 1069-1086).*

* cited by examiner

*Primary Examiner* — Elizabeth Gwartney
(74) *Attorney, Agent, or Firm* — Michael I. Stewart; Sim & McBurney

(57) ABSTRACT

A soy protein product having a protein content of at least about 60 wt % (N×6.25) d.b., preferably an isolate having a protein content of at least about 90 wt % (N×6.25) d.b., is formed by extracting a soy protein source with a salt solution, preferably aqueous sodium chloride solution, to form an aqueous protein solution having a pH of about 1.5 to 11, preferably about 5 to about 7 and separating the resulting aqueous protein solution from residual soy protein source. The protein concentration of the aqueous protein solution is increased to about 50 to about 400 g/L while the ionic strength is maintained substantially constant by using a selective membrane technique. The resulting concentrated protein solution is optionally diafiltered and a calcium salt, preferably calcium chloride, is added to the concentrated and optionally diafiltered protein solution to a conductivity of 15 to about 85 mS. Precipitate formed as a result of the calcium salt addition is removed and the resulting clarified retentate is diluted into about 2 to about 20 volumes of water prior to acidification to a pH of about 1.5 to about 4.4 to produce an acidified clear protein solution. The acidified clear protein solution is then concentrated and optionally diafiltered and optionally dried. Variations of this procedure can be used to produce a soy protein product which is soluble, transparent and heat stable in acidic aqueous environments.

57 Claims, No Drawings

PRODUCTION OF ACID SOLUBLE SOY PROTEIN ISOLATES ("S700")

REFERENCE TO RELATED APPLICATION

This application claims priority under 35 USC 119(e) from U.S. Provisional Patent Application No. 61/213,648 filed Jun. 30, 2009.

FIELD OF INVENTION

The invention relates to the production of soy protein products.

BACKGROUND TO THE INVENTION

In U.S. Provisional Patent Applications Nos. 61/107,112 (7865-373) filed Oct. 21, 2008, 61/193,457 (7865-374) filed Dec. 2, 2008, 61/202,070 (7865-376) filed Jan. 26, 2009, 60/202,553 filed Mar. 12, 2009 (7865-383), 61/213,717 (7865-389) filed Jul. 7, 2009, 61/272,241 (7865-400) filed Sep. 3, 2009 and U.S. patent application Ser. No. 12/603,087 (7865-415) filed Oct. 21, 2009 (US Patent Publication No. 2010-0098818), assigned to the assignee hereof and the disclosures of which are incorporated herein by reference, there is described the preparation of a soy protein product, preferably a soy protein isolate, which is completely soluble at low pH values and is capable of providing transparent and heat stable solutions at such low pH values. This soy protein product may be used for protein fortification of, in particular, soft drinks and sports drinks, as well as other acidic aqueous systems, without precipitation of protein. The soy protein product is produced by extracting a soy protein source with aqueous calcium chloride solution at natural pH, optionally diluting the resulting aqueous soy protein solution, adjusting the pH of the aqueous soy protein solution to a pH of about 1.5 to about 4.4, preferably about 2.0 to about 4.0, to produce an acidified clear soy protein solution, which may be optionally concentrated and/or diafiltered before drying.

SUMMARY OF THE INVENTION

We have now found that a soy protein product of comparable properties may be formed by a procedure involving extraction of the soy protein source with a monovalent salt solution followed by calcium chloride addition to the extracted protein solution, before or after concentration. Precipitate formed upon addition of the calcium chloride is removed prior to subsequent processing.

The soy protein product provided herein is soluble at acid pH values to provide transparent and heat stable aqueous solutions thereof. The soy protein product may be used for protein fortification of, in particular, soft drinks and sports drinks, without precipitation of protein.

In accordance with one aspect of the present invention, there is provided a method of producing a soy protein product with a protein content of at least about 60 wt % (N×6.25) on a dry weight basis (d.b.), preferably at least about 90 wt %, more preferably at least about 100 wt %, which comprises:
(a) extracting a soy protein source with a salt solution, preferably aqueous sodium chloride solution, at a temperature of at least about 1° C., preferably about 15° to about 35° C., to cause solubilization of soy protein in the soy protein source and to form an aqueous protein solution having a protein content of about 5 to about 50 g/L, preferably about 10 to about 50 g/L, and a pH of about 1.5 to about 11, preferably about 5 to about 7,
(b) separating the aqueous protein solution from residual soy protein source,
(c) increasing the protein concentration of the aqueous protein solution to about 50 to about 400 g/L, preferably about 100 to about 250 g/L, while maintaining the ionic strength substantially constant by using a selective membrane technique to provide a concentrated protein solution,
(d) optionally diafiltering the concentrated protein solution,
(e) adding calcium salt solution, preferably aqueous calcium chloride solution, to the concentrated protein solution to a conductivity of about 15 to about 85 mS, preferably about 17 to about 25 mS, to cause a precipitate to form in the concentrated protein solution,
(f) removing the precipitate from the concentrated protein solution,
(g) diluting the clarified concentrated protein solution into about 2 to about 20 volumes of water, preferably about 10 to about 15, having a temperature of about 2° to about 90° C., preferably about 10° to about 50° C., more preferably about 20° to about 30° C.,
(h) acidifying the resulting solution to a pH of about 1.5 to about 4.4, preferably about 2.0 to about 4.0, to produce an acidified clear protein solution,
(i) optionally polishing the acidified clear protein solution,
(j) increasing the concentration of the acidified clear protein solution to about 50 to about 300 g/L, preferably about 100 to about 200 g/L, while maintaining the ionic strength substantially constant by using a selective membrane technique to provide a second concentrated protein solution,
(k) optionally diafiltering the second concentrated protein solution, and
(l) optionally drying the second concentrated protein solution to provide a soy protein product having a protein content of at least about 60 wt % (N×6.25) d.b., preferably at least about 90 wt %, more preferably at least about 100 wt %.

A number of variations of this procedure may be adopted in accordance with the invention to result in a soy protein product that is soluble, transparent and heat stable in an acidic aqueous environment.

In one such variation, the calcium salt solution, preferably aqueous calcium chloride, may be added to the aqueous protein solution following separation from the soy protein source and prior to concentrating the solution. Following addition of the calcium chloride, the precipitate formed in the step is removed.

The resulting aqueous soy protein solution may be further processed by the steps of concentration, dilution, pH adjustment, further concentration and drying, as described above.

Accordingly, in a further aspect of the present invention, there is provided a method of producing a soy protein product with a protein content of at least about 60 wt % (N×6.25) d.b., preferably at least about 90 wt %, more preferably at least about 100 wt %, which comprises:
(a) extracting a soy protein source with a salt solution, preferably an aqueous sodium chloride solution, at a temperature of at least about 1° C., preferably about 15° to about 35° C., to cause solubilization of soy protein in the soy protein source and to form an aqueous protein solution having a protein content of about 5 to about 50 g/L, preferably about 10 to about 50 g/L, and a pH of about 1.5 to about 11, preferably about 5 to about 7,
(b) separating the aqueous protein solution from residual soy protein source, (c) adding calcium salt solution, preferably aqueous calcium chloride solution, to the aqueous protein solution to a conductivity of about 15 to about 85 mS, preferably about 17 to about 25 mS, to cause a precipitate to form in the aqueous protein solution, (d) removing the precipitate from the aqueous soy protein solution, (e) increasing the protein concentration of the soy protein solution to about 50 to about 400 g/L, preferably about 100 to about 250 g/L, while maintaining the ionic strength substantially constant by using a selective membrane technique to provide a concentrated protein solution, (f) optionally diafiltering the concentrated protein solution, (g) diluting the concentrated and optionally diafiltered protein solution into about 2 to about 20 volumes of water, preferably about 10 to about 15, having a temperature of about 2° to about 90° C., preferably about 10° to about 50° C., more preferably about 20° to about 30° C., (h) acidifying the resulting solution to a pH of about 1.5 to about 4.4, preferably about 2.0 to about 4.0, to produce an acidified clear protein solution, (i) optionally polishing the acidified clear protein solution, (j) increasing the concentration of the acidified clear protein solution to about 50 to about 300 g/L, preferably about 100 to about 200 g/L, while maintaining the ionic strength substantially constant by using a selective membrane technique to provide a second concentrated protein solution, (k) optionally diafiltering the second concentrated protein solution, and (l) optionally drying the second concentrated protein solution to provide a soy protein product having a protein content of at least about 60 wt % (N×6.25) d.b., preferably at least about 90 wt %, more preferably at least about 100 wt %.

In another variation, the calcium salt solution, preferably aqueous calcium chloride, may be added to the aqueous protein solution following separation from the soy protein source and prior to concentrating the solution. Following addition of the calcium chloride, the precipitate formed in the step is removed.

The resulting aqueous soy protein solution may be further processed by the steps of partial concentration, dilution, pH adjustment, further concentration and drying.

Accordingly, in accordance with a further aspect of the present invention, there is provided a method of producing a soy protein product with a protein content of at least about 60 wt % (N×6.25) d.b., preferably at least about 90 wt %, more preferably at least about 100 wt %, which comprises:

(a) extracting a soy protein source with a salt solution, preferably an aqueous sodium chloride solution, at a temperature of at least about 1° C., preferably about 15° to about 35° C., to cause solubilization of soy protein in the soy protein source and to form an aqueous protein solution having a protein content of about 5 to about 50 g/L, preferably about 10 to about 50 g/L, and a pH of about 1.5 to about 11, preferably about 5 to about 7, (b) separating the aqueous protein solution from residual soy protein source, (c) adding calcium salt solution, preferably aqueous calcium chloride solution, to the aqueous protein solution to a conductivity of about 15 to about 85 mS, preferably about 17 to about 25 mS, to cause a precipitate to form in the aqueous protein solution, (d) removing the precipitate from the aqueous soy protein solution, (e) partially concentrating the aqueous protein solution to about 50 g/L or less while maintaining the ionic strength substantially constant by using a selective membrane technique to provide a partially concentrated protein solution, (f) optionally diafiltering the partially concentrated protein solution, (g) diluting the partially concentrated protein solution into about 0.5 to about 20 volumes of water, preferably about 1 to about 10 volumes of water, more preferably about 2 to about 5 volumes of water, having a temperature of about 2° to about 90° C., preferably about 10° to about 50° C., more preferably about 20° to about 30° C., (h) acidifying the resulting solution to a pH of about 1.5 to about 4.4, preferably about 2.0 to about 4.0, to produce an acidified clear protein solution, (i) optionally polishing the acidified clear protein solution, (j) increasing the concentration of the acidified clear protein solution to about 50 to about 300 g/L, preferably about 100 to about 200 g/L, while maintaining the ionic strength substantially constant by using a selective membrane technique to provide a concentrated protein solution, (k) optionally diafiltering the concentrated protein solution, and (l) optionally drying the concentrated protein solution to provide a soy protein product having a protein content of at least about 60 wt % (N×6.25) d.b., preferably at least about 90 wt %, more preferably at least about 100 wt %.

In another variation, the calcium salt solution, preferably aqueous calcium chloride may be added to the aqueous soy protein solution following separation from the soy protein source and prior to concentrating the solution. Following addition of the calcium chloride, the precipitate formed in the step is removed.

The resulting aqueous soy protein solution may be diluted to decrease the conductivity, such as by one volume of water, and then adjusted in pH with acid. The acidified solution may then be concentrated and diafiltered to further decrease the conductivity resulting in a clear, low pH solution ready for drying.

Accordingly, in another aspect of the present invention, there is provided a method of producing a soy protein product with a protein content of at least about 60 wt % (N×6.25) d.b., preferably at least about 90 wt %, more preferably at least about 100 wt %, which comprises:

(a) extracting a soy protein source with a salt solution, preferably an aqueous sodium chloride solution, at a temperature of at least about 1° C., preferably about 15° to about 35° C., to cause solubilization of soy protein in the soy protein source and to form an aqueous protein solution having a protein content of about 5 to about 50 g/L, preferably about 10 to about 50 g/L, and a pH of about 1.5 to about 11, preferably about 5 to about 7, (b) separating the aqueous protein solution from residual soy protein source, (c) adding calcium salt solution, preferably aqueous calcium chloride solution, to the aqueous protein solution to a conductivity of about 15 to about 85 mS, preferably about 17 to about 25 mS, to cause a precipitate to form in the aqueous protein solution, (d) removing the precipitate from the protein solution, (e) diluting the clarified solution with about 0.5 to about 10 volumes of water, preferably about 0.5 to about 2 volumes of water, having a temperature of about 2° C. to about 90° C., preferably about 10° C. to about 50° C., more preferably about 20° C. to about 30° C.

(f) acidifying the resulting solution to a pH of about 1.5 to about 4.4, preferably about 2.0 to about 4.0, to produce an acidified clear protein solution, (g) optionally polishing the acidified clear protein solution, (h) increasing the concentration of the acidified clear protein solution to a protein concentration of about 50 to about 300 g/L, preferably about 100 to about 200 g/L, while maintaining the ionic strength substantially constant by using a selective membrane technique to provide a concentrated protein solution, (i) optionally diafiltering the concentrated protein solution, and (j) optionally drying the concentrated protein solution to provide a soy protein product having a protein content of at least about 60 wt % (N×6.25) d.b., preferably at least about 90 wt %, more preferably at least about 100 wt %.

In another such variation, the calcium salt solution, preferably aqueous calcium chloride may be added to partially concentrated soy protein solution and the resulting precipitate removed from the partially concentrated soy protein solution. The clarified solution may then be put back on the membrane system for additional concentration prior to the dilution, pH adjustment, further concentrating and drying steps described above.

Accordingly, in an additional aspect of the invention, there is provided a method of producing a soy protein product with a protein content of at least about 60 wt % (N×6.25), preferably at least about 90 wt %, more preferably at least about 100 wt %, which comprises:

(a) extracting a soy protein source with a salt solution, preferably aqueous sodium chloride solution, at a temperature of at least about 1° C., preferably about 15° to about 35° C., to cause solubilization of soy protein in the soy protein source and to form an aqueous protein solution having a protein content of about 5 to about 50 g/L, preferably about 10 to about 50 g/L, and a pH of about 1.5 to about 11, preferably about 5 to about 7, (b) separating the aqueous protein solution from residual soy protein source, (c) partially concentrating the aqueous protein solution to about 50 g/L or less while maintaining the ionic strength substantially constant by using a selective membrane technique to provide a partially concentrated protein solution, (d) optionally diafiltering the partially concentrated protein solution, (e) adding calcium salt solution to the partially concentrated protein solution to a conductivity of about 15 mS to about 85 mS, preferably about 17 mS to about 25 mS, to cause a precipitate to form in the partially concentrated protein solution, (f) removing the precipitate from the partially concentrated protein solution, (g) further increasing the protein concentration of the partially concentrated protein solution to about 50 to about 400 g/L, preferably about 100 to about 250 g/L, while maintaining the ionic strength substantially constant by using a selective membrane technique to provide a concentrated protein solution, (h) optionally diafiltering the concentrated protein solution, (i) diluting the concentrated protein solution into about 2 to about 20 volumes of water, preferably about 10 to about 15, having a temperature of about 2° to about 90° C., preferably about 10° to about 50° C., more preferably about 20° to about 30° C., (j) acidifying the resulting solution to a pH of about 1.5 to about 4.4, preferably about 2.0 to about 4.0, to produce an acidified clear protein solution, (k) optionally polishing the acidified clear protein solution, (l) increasing the concentration of the acidified clear protein solution to a protein concentration of about 50 to about 300 g/L, preferably about 100 to about 200 g/L, while maintaining the ionic strength substantially constant by using a selective membrane technique to provide a second concentrated protein solution, (k) optionally diafiltering the second concentrated protein solution, and (l) optionally drying the second concentrated protein solution to provide a soy protein product having a protein content of at least about 60 wt % (N×6.25) d.b., preferably at least about 90 wt %, more preferably at least about 100 wt %.

Alternatively, the partially concentrated soy protein solution, clarified after calcium chloride treatment, may be diluted sufficiently to decrease the conductivity, pH adjusted and then concentrated and diafiltered prior to drying.

Accordingly, in a further aspect of the invention, there is provided a method of producing a soy protein product with a protein content of at least about 60 wt % (N×6.25), preferably at least about 90 wt %, more preferably at least about 100 wt %, which comprises:

(a) extracting a soy protein source with a salt solution, preferably an aqueous sodium chloride solution, at a temperature of at least about 1° C., preferably about 15° to about 35° C., to cause solubilization of soy protein in the soy protein source and to form an aqueous protein solution having a protein content of about 5 to about 50 g/L, preferably about 10 to about 50 g/L, and a pH of about 1.5 to about 11, preferably about 5 to about 7, (b) separating the aqueous protein solution from residual soy protein source, (c) partially concentrating the aqueous protein solution to a protein concentration of about 50 g/L or less while maintaining the ionic strength substantially constant by using a selective membrane technique to provide a partially concentrated protein solution, (d) optionally diafiltering the partially concentrated protein solution, (e) adding calcium salt solution, preferably aqueous calcium chloride solution, to the partially concentrated protein solution to a conductivity of 15 mS to about 85 mS, preferably about 17 mS to about 25 mS, to cause a precipitate to form in the partially concentrated protein solution, (f) removing the precipitate from the partially concentrated protein solution, (g) diluting the clarified partially concentrated protein solution into about 0.5 to about 20 volumes of water, preferably about 1 to about 10 volumes of water, more preferably about 2 to about 5 volumes of water, having a temperature of about 2° to about 90° C., preferably about 10° to about 50° C., more preferably about 20° to about 30° C., (h) acidifying the resulting solution to a pH of about 1.5 to about 4.4, preferably about 2.0 to about 4.0, to produce an acidified clear protein solution, (i) optionally polishing the acidified clear protein solution, (j) increasing the concentration of the acidified clear protein solution to about 50 to about 300 g/L, preferably about 100 to about 200 g/L, while maintaining the ionic strength substantially constant by using a selective membrane technique to provide a concentrated protein solution, (k) optionally diafiltering the concentrated protein solution, and (l) optionally drying the concentrated protein solution to provide a soy protein product having a protein content of at least about 60 wt % (N×6.25) d.b., preferably at least about 90 wt %, more preferably at least about 100 wt %.

While the present invention refers mainly to the production of soy protein isolates, it is contemplated that soy protein products of lesser purity may be provided with substantially similar properties to the soy protein isolates. Such lesser purity products may have a protein concentration of at least about 60% by weight (N×6.25) d.b.

The novel soy protein product of the invention can be blended with powdered drinks for the formation of aqueous soft drinks or sports drinks by dissolving the same in water. Such blend may be a powdered beverage.

The soy protein product provided herein may be provided as an aqueous solution thereof having a high degree of clarity at acid pH values and which is heat stable at these pH values.

In another aspect of the present invention, there is provided an aqueous solution of the soy product provided herein which is heat stable at low pH. The aqueous solution may be a beverage, which may be a clear beverage in which the soy protein product is completely soluble and transparent or an opaque beverage in which the soy protein product does not increase the opacity. The soy protein product also has good solubility at about pH 7.5 to about pH 8.0, providing aqueous solutions with good clarity and heat stability. An aqueous solution of the soy protein product prepared at about pH 7.5 to about pH 8 may be a beverage.

The soy protein products produced according to the process herein lack the characteristic beany flavour of soy protein isolates and are suitable, not only for protein fortification of acidic media, but may be used in a wide variety of conventional applications of protein isolates, including but not limited to protein fortification of processed foods and beverages, emulsification of oils, as a body former in baked goods and foaming agent in products which entrap gases. In addition, the soy protein product may be formed into protein fibers, useful in meat analogs, may be used as an egg white substitute or extender in food products where egg white is used as a binder. The soy protein product may be used in nutritional supplements. Other uses of the soy protein products are in pet foods, animal feed and in industrial and cosmetic applications and in personal care products.

GENERAL DESCRIPTION OF INVENTION

The initial step of the process of providing the soy protein product involves solubilizing soy protein from a soy protein source. The soy protein source may be soybeans or any soy product or by-product derived from the processing of soybeans including but not limited to soy meal, soy flakes, soy grits and soy flour. The soy protein source may be used in the full fat form, partially defatted form or fully defatted form. Where the soy protein source contains an appreciable amount of fat, an oil-removal step generally is required during the process. The soy protein recovered from the soy protein source may be the protein naturally occurring in soybean or the proteinaceous material may be a protein modified by genetic manipulation but possessing characteristic hydrophobic and polar properties of the natural protein.

Protein solubilization may be effected by using a food grade salt solution such as a solution of food grade sodium chloride. Where the soy protein product is intended for non-food uses, non-food-grade chemicals may be used. Other monovalent salts also may be used, such as potassium chloride. As the concentration of the salt solution increases, the degree of solubilization of protein from the soy protein source initially increases until a maximum value is achieved. Any subsequent increase in salt concentration does not increase the total protein solubilized. The concentration of the salt solution which causes maximum protein solubilization varies depending on the salt concerned. It is usually preferred to utilize a concentration value less than about 1.0 M, and more preferably a value of about 0.10 M to about 0.15 M.

In a batch process, the salt solubilization of the protein is effected at a temperature of from about 1° C. to about 100° C., preferably about 15° to about 35° C., preferably accompanied by agitation to decrease the solubilization time, which is usually about 1 to about 60 minutes. It is preferred to effect the solubilization to extract substantially as much protein from the soy protein source as is practicable, so as to provide an overall high product yield.

In a continuous process, the extraction of the protein from the soy protein source is carried out in any manner consistent with effecting a continuous extraction of protein from the soy protein source. In one embodiment, the soy protein source is continuously mixed with a food grade salt solution and the mixture is conveyed through a pipe or conduit having a length and at a flow rate for a residence time sufficient to effect the desired extraction in accordance with the parameters described herein. In such continuous procedure, the protein solubilization step is effected rapidly, in a time of up to about 10 minutes, preferably to effect solubilization to extract substantially as much protein from the soy protein source as is practicable. The solubilization in the continuous procedure is effected at temperatures between about 1° C. and about 100° C., preferably between about 15° C. and about 35° C.

The extraction may be carried out at the natural pH of the soy protein source/salt solution system, generally about 5 to about 7. Alternatively, the pH of the extraction may be adjusted to any desired value within the range of about 1.5 to about 11, preferably about 5 to about 7, by the use of any convenient acid, usually hydrochloric acid, or alkali, usually sodium hydroxide, as required.

The concentration of soy protein source in the food grade salt solution during the solubilization step may vary widely. Typical concentration values are about 5 to about 15% w/v.

The protein extraction step with the aqueous salt solution has the additional effect of solubilizing fats which may be present in the soy protein source, which then results in the fats being present in the aqueous phase.

The protein solution resulting from the extraction step generally has a protein concentration of about 5 to about 50 g/L, preferably about 10 to about 50 g/L.

The aqueous salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit the oxidation of any phenolics in the protein solution.

The aqueous phase resulting from the extraction step then may be separated from the residual soy protein source, in any convenient manner, such as by employing a decanter centrifuge, followed by disc centrifugation and/or filtration to remove residual soy protein source material. The separated residual soy protein source may be dried for disposal. Alternatively, the separated residual soy protein source may be processed to recover some residual protein. For example, the separated residual soy protein source may be processed by a conventional isoelectric precipitation procedure or any other convenient procedure to recover such residual protein.

Where the soy protein source contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution. Alternatively, defatting of the aqueous protein solution may be achieved by any other convenient procedure.

The aqueous soy protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% w/v, preferably about 0.05% to about 2% w/v, is employed. The adsorbing agent may be removed from the soy protein solution by any convenient means, such as by filtration.

As an alternative to extracting the soy protein source with an aqueous salt solution, such extraction may be made using water alone. Where such alternative is employed, then the salt, in the concentrations discussed above may be added to the protein solution after separation from the residual soy protein source. When a first fat removal step is carried out, the salt is generally added after completion of such operations.

As an alternative to processing the aqueous protein solution at the pH of extraction, the aqueous soy protein solution resulting from the extraction step may be pH adjusted to the range of about 5 to about 7, prior to further processing as discussed below. Such pH adjustment may be effected using any convenient acid, such as hydrochloric acid, or alkali, such as sodium hydroxide, as appropriate. If necessary, the protein solution may be clarified by any convenient procedure such as centrifugation or filtration after the pH adjustment and prior to further processing.

The aqueous soy protein solution is then concentrated to increase the protein concentration thereof while maintaining the ionic strength thereof substantially constant. Such concentration generally is effected to provide a concentrated protein solution having a protein concentration of about 50 to about 400 g/L, preferably about 100 to about 250 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 1,000,000 Daltons, preferably about 5,000 to about 100,000 Daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as carbohydrates, pigments, low molecular weight proteins and anti-nutritional factors, such as trypsin inhibitors, which themselves are low molecular weight proteins. The molecular weight cut-off of the membrane is usually chosen to ensure retention of a significant proportion of the protein in the solution, while permitting contaminants to pass through having regard to the different membrane materials and configurations.

The protein solution may be subjected to a diafiltration step, before or after complete concentration, preferably using an aqueous salt solution of the same molarity and pH as the extraction solution. Such diafiltration may be effected using from about 2 to about 40 volumes of diafiltration solution, preferably about 5 to about 25 volumes of diafiltration solution. In the diafiltration operation, further quantities of contaminants are removed from the aqueous soy protein solution by passage through the membrane with the permeate. The diafiltration operation may be effected until no significant further quantities of contaminants or visible colour are present in the permeate. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the soy protein solution.

The concentration step and the diafiltration step may be effected at any convenient temperature, generally about 2° to about 60° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of removal of contaminants to the permeate.

For example, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to about 1,000,000 Da, operating the membrane at elevated temperatures, such as about 30 to about 60° C. and employing greater volumes of diafiltration medium, such as about 20 to about 40 volumes.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the concentrated protein solution before or after diafiltration, may be added to the acidified, concentrated protein solution before or after diafiltration, or may be dry blended with the dried soy protein product. The addition of the reducing agent may be combined with the membrane processing steps, as described above or a heat treatment step as described below.

If it is desired to retain active trypsin inhibitors in the concentrated protein solution, this can be achieved by utilizing a concentration and diafiltration membrane with a smaller pore size, operating the membrane at lower temperatures, employing fewer volumes of diafiltration medium and not employing a reducing agent.

The concentrated and optionally diafiltered protein solution may be subject to a further defatting operation, if required, as described in U.S. Pat. Nos. 5,844,086 and 6,005, 076. Alternatively, defatting of the concentrated and optionally diafiltered protein solution may be achieved by any other convenient procedure.

The concentrated and optionally diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered soy protein solution may be subjected to pasteurization to reduce the microbial load. Such pasteurization may be effected under any desired pasteurization conditions. Generally, the concentrated and optionally diafiltered soy protein solution is heated to a temperature of about 55° to about 70° C., preferably about 60° to about 65° C., for about 30 seconds to about 60 minutes, preferably about 10 minutes to about 15 minutes. The pasteurized concentrated soy protein solution then may be cooled for further processing as described below, preferably to a temperature of about 20° to about 35° C.

Following the concentration step and optional diafiltration, defatting, adsorbent treatment and pasteurization steps, a calcium salt, usually calcium chloride solution, is added to the resulting solution. This addition causes the formation of a precipitate containing primarily phytate. Sufficient calcium chloride is added to provide a solution having a conductivity generally of about 15 to about 85 mS, preferably of about 17 to about 25 mS.

Although the addition of calcium salt is usually effected using calcium chloride solution, solutions of other calcium salts may be used. Alternatively, the calcium salt may be added in a dry form. In addition, other alkaline earth metal salts may be used.

The addition of the calcium salt may be effected at a temperature of about 2° to about 70° C., preferably about 20° C. to about 35° C. Following addition of the calcium salt, the precipitated material is removed from the protein solution by any convenient means, such as by centrifugation or filtration.

The concentrated protein solution from the phytate precipitation is then diluted by mixing the retentate with water having a volume required to achieve the degree of dilution desired. The concentrated protein solution generally is diluted about 2 to about 20 fold, preferably about 10 to about 15 fold. The water with which the concentrated protein solution is mixed has a temperature of about 2° to about 90° C., preferably about 10° to about 50° C., more preferably about 20° to about 30° C. Dilution of the concentrated protein solution results in the formation of a protein precipitate. Acidification of the diluted solution resolubilizes the protein and results in a transparent solution further processed as detailed below. Alternatively, the precipitate may be collected and dried by any convenient means.

The diluted retentate then is adjusted in pH to about 1.5 to about 4.4, preferably about 2.0 to about 4.0, by the addition of any suitable acid, such as hydrochloric acid or phosphoric acid, to result in a clear aqueous soy protein solution. The diluted and acidified protein solution may optionally be polished by any convenient means such as filtration.

The acidified clear soy protein solution may be subjected to a heat treatment to inactivate heat labile anti-nutritional factors, such as trypsin inhibitors, present in such solution as a result of extraction from a soy protein source material during the extraction step. Such a heating step also provides the additional benefit of reducing the microbial load. Generally, the protein solution is heated to a temperature of about 70° to about 160° C., preferably about 80° to about 120° C., more preferably about 85° C. to about 95° C., for about 10 seconds to about 60 minutes, preferably about 30 seconds to about 5 minutes. The heat treated acidified soy protein solution then may be cooled for further processing as described below, preferably to a temperature of about 2° C. to about 60° C., more preferably about 20° C. to about 35° C.

The acidified clear soy protein solution is concentrated to increase the protein concentration thereof while maintaining the ionic strength thereof substantially constant. Such concentration generally is effected to provide a concentrated protein solution having a protein concentration of about 50 to about 300 g/L, preferably about 100 to about 200 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 1,000,000 Daltons, preferably about 5,000 to about 100,000 Daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as, carbohydrates, pigments, low molecular weight proteins and anti-nutritional factors. The molecular weight cut-off of the membrane is usually chosen to ensure retention of a significant proportion of the protein in the solution, while permitting contaminants to pass through having regard to the different membrane materials and configurations.

The protein solution may be subjected to a diafiltration step, before or after complete concentration, using water or a dilute saline solution. The diafiltration solution may be at its natural pH or at a pH equal to the protein solution being diafiltered or at any pH value in between. Such diafiltration may be effected using from about 2 to about 40 volumes of diafiltration solution, preferably about 5 to about 25 volumes of diafiltration solution. In the diafiltration operation, further quantities of contaminants are removed from the clear aqueous soy protein solution by passage through the membrane with the permeate. The diafiltration operation may be effected until no significant further quantities of contaminants or visible colour are present in the permeate or until the retentate has been sufficiently purified so as, when dried, to provide a soy protein isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the soy protein solution.

The concentration step and the optional diafiltration step may be effected at any convenient temperature, generally about 2° C. to about 60° C., preferably about 20° C. to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

There are two main trypsin inhibitors in soy, namely the Kunitz inhibitor, which is a heat-labile molecule with a molecular weight of approximately 21,000 Daltons, and the Bowman-Birk inhibitor, a more heat-stable molecule with a molecular weight of about 8,000 Daltons. The level of trypsin inhibitor activity in the final soy protein product can be controlled by manipulation of various process variables.

As noted above, heat treatment of the acidified clear soy protein solution may be used to inactivate heat-labile trypsin inhibitors. The partially concentrated or fully concentrated acidified clear soy protein solution may also be heat treated to inactivate heat labile trypsin inhibitors.

Acidifying and membrane processing the diluted protein solution at a lower pH (1.5 to 3.0) may reduce the trypsin inhibitor activity relative to processing the solution at higher pH (3.0 to 4.4). When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide.

As mentioned above, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to about 1,000,000 Da, operating the membrane at elevated temperatures, such as about 30 to about 60° C. and employing greater volumes of diafiltration medium, such as about 20 to about 40 volumes.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

If it is desired to retain active trypsin inhibitors in the concentrated protein solution, this can be achieved by utilizing a concentration and diafiltration membrane with a smaller pore size, operating the membrane at lower temperatures, employing fewer volumes of diafiltration medium and not employing a reducing agent.

The concentrated and optionally diafiltered aqueous acidified protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered acidified clear aqueous soy protein solution may be dried by any convenient technique, such as spray drying or freeze drying. The pasteurization step described above may be effected on the soy protein solution prior to drying. The dry soy protein product has a protein content, in excess of about 60 wt % protein. Preferably the dry soy protein product is an isolate containing at least about 90 wt % protein, more preferably at least about 100 wt % (N×6.25). The soy protein product is low in phytic acid content, generally less than about 1.5% by weight. By partially concentrating and/or partially diafiltering the aqueous soy protein solution, it is possible to only partially remove contaminants and thereby result in a dry soy protein product of lesser purity.

As noted above there are several variations on the procedure described herein to produce the soy protein product and involve several modifications to the steps outlined herein.

The soy protein product produced herein is soluble in an acidic aqueous environment, making the product ideal for incorporation into beverages, both carbonated and uncarbonated, to provide protein fortification thereto. Such beverages have a wide range of acidic pH values, ranging from about 2.5 to about 5. The soy protein product provided herein may be added to such beverages in any convenient quantity to provide protein fortification to such beverages, for example, to supply at least about 5 g of soy protein per serving. The added soy protein product dissolves in the beverage and does not impair the clarity of the beverage, even after thermal processing. The soy protein product may be blended with dried beverage prior to reconstitution of the beverage by dissolution in water. In some cases, modification of the normal formulation may be necessary where components present in the beverage may adversely affect the ability of the composition to remain dissolved in the beverage.

EXAMPLES

Example 1

This Example illustrates the preparation of a dried soy protein isolate in accordance with one embodiment of the invention.

20 kg of defatted, minimally heat treated soy flour was added to 200 L of 0.15M sodium chloride solution at ambient temperature and agitated for 30 minutes to provide an aqueous protein solution. The bulk of the residual soy flour was removed by centrifugation to provide 165.4 L of solution having a protein content of 2.14% by weight. Sufficient calcium chloride was added to raise the conductivity of the solution to 22 mS and a precipitate formed. This precipitate was removed by centrifugation to provide 156.2 L of solution having a protein content that was not determined. This solution was combined with 156.2 L of reverse osmosis purified water and the pH lowered to 3 by the addition of diluted HCl. The resulting solution had a protein content of 0.65% by weight and a conductivity of 13.37 mS. This solution was polished by filtration. Post clarification, a total volume of 350 L of solution was obtained having a protein content of 0.53% by weight.

The 350 L of filtered protein solution was reduced in volume to 26.42 kg by concentration on a PVDF membrane having a molecular weight cutoff of 5,000 daltons. The concentrated protein solution was then diafiltered with 125 L of reverse osmosis purified water that had been adjusted to pH 3 with diluted HCl. The resulting diafiltered, concentrated protein solution had a protein content of 6.99% by weight and represented a yield of 72.6 wt % of the initial filtered protein solution. The diafiltered, concentrated protein solution was then dried to yield a product found to have a protein content of 101.44% (N×6.25) d.b. The product was termed S005-A19-09A S700.

A 3.2% w/v protein solution of S005-A19-09A S700 was prepared in water and the colour and clarity assessed using a HunterLab ColorQuest XE instrument operated in transmission mode. The pH of the solution was measured with a pH meter.

The pH, colour and clarity values are set forth in the following Table 1:

TABLE 1 pH and HunterLab scores for 3.2% protein solution of S005-A19-09A S700

| Sample | pH | L* | a* | b* | Haze (%) |
|---|---|---|---|---|---|
| S005-A19-09A S700 | 3.02 | 96.95 | −0.87 | 8.72 | 2.3 |

As may be seen from Table 1, the colour of the S700 solution was very light and very little haze was detected.

The colour of the dry powder was also assessed with the HunterLab ColorQuest XE instrument in reflectance mode. The colour values are set forth in the following Table 2:

TABLE 2

HunterLab scores for S005-A19-09A S700 dry powder

| Sample | L* | a* | b* |
|---|---|---|---|
| S005-A19-09A S700 | 87.32 | −0.04 | 9.59 |

As may be seen from Table 2, the dry product was very light in colour.

Example 2

This Example contains an evaluation of the heat stability in water of the soy protein isolate produced by the method of Example 1 (S700).

A 2% w/v protein solution of S005-A19-09A S700 in water was produced and the pH adjusted to 3. The clarity of this solution was assessed by haze measurement with the HunterLab ColorQuest XE instrument. The solution was then heated to 95° C., held at this temperature for 30 seconds and then immediately cooled to room temperature in an ice bath. The clarity of the heat treated solution was then measured again.

The clarity of the protein solution before and after heating is set forth in the following Table 3:

TABLE 3

Effective of heat treatment on clarity of S005-A19-09A S700 solution

| Sample | Haze (%) |
|---|---|
| Before heating | 1.4 |
| After heating | 2.5 |

As can be seen from the results in Table 3, the initial solution of S700 had very little haze, as did the heat-treated sample.

Example 3

This Example contains an evaluation of the solubility in water of the soy protein isolate produced by the method of Example 1 (S700). Solubility was tested based on protein solubility (termed protein method, a modified version of the procedure of Morr et al., J. Food Sci. 50:1715-1718) and total product solubility (termed pellet method).

Sufficient protein powder to supply 0.5 g of protein was weighed into a beaker and then a small amount of reverse osmosis (RO) purified water was added and the mixture stirred until a smooth paste formed. Additional water was then added to bring the volume to approximately 45 ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected two times during the 60 minutes stirring. After the 60 minutes of stirring, the samples were made up to 50 ml total volume with RO water, yielding a 1% w/v protein dispersion. The protein content of the dispersions was measured using a Leco FP528 Nitrogen Determinator. Aliquots (20 ml) of the dispersions were then transferred to pre-weighed centrifuge tubes that had been dried overnight in a 100° C. oven then cooled in a desiccator and the tubes capped. The samples were centrifuged at 7800 g for 10 minutes, which sedimented insoluble material and yielded a clear supernatant. The protein content of the supernatant was measured by Leco analysis and then the supernatant and the tube lids were discarded and the pellet material dried overnight in an oven set at 100° C. The next morning the tubes were transferred to a desiccator and allowed to cool. The weight of dry pellet material was recorded. The dry weight of the initial protein powder was calculated by multiplying the weight of powder used by a factor of ((100−moisture content of the powder (%))/100). Solubility of the product was then calculated two different ways:

Solubility (protein method) (%)=(% protein in supernatant/% protein in initial dispersion)×100        1)

Solubility (pellet method) (%)=(1−(weight dry insoluble pellet material/((weight of 20 ml of dispersion/weight of 50 ml of dispersion)×initial weight dry protein powder)))×100        2)

The natural pH value of the protein isolate produced in Example 1 in water (1% protein) is shown in Table 4:

TABLE 4

Natural pH of S700 solution prepared in water at 1% protein

| Batch | Product | Natural pH |
|---|---|---|
| S005-A 19-09A | S700 | 3.21 |

The solubility results obtained are set forth in the following Tables 5 and 6:

TABLE 5

Solubility of S700 at different pH values based on protein method

| | | Solubility (protein method) (%) | | | | | | |
|---|---|---|---|---|---|---|---|---|
| Batch | Product | pH 2 | pH 3 | pH 4 | pH 5 | pH 6 | pH 7 | Nat. pH |
| S005-A19-09A | S700 | 100 | 100 | 100 | 8.5 | 39.6 | 47.9 | 95.8 |

TABLE 6

Solubility of S700 at different pH values based on pellet method

| | | Solubility (pellet method) (%) | | | | | | |
|---|---|---|---|---|---|---|---|---|
| Batch | Product | pH 2 | pH 3 | pH 4 | pH 5 | pH 6 | pH 7 | Nat. pH |
| S005-A19-09A | S700 | 98.7 | 100 | 98.2 | 20.9 | 45.3 | 64.3 | 98.9 |

As can be seen from the results of Tables 5 and 6, the S700 product was very soluble in the pH range of 2 to 4.

Example 4

This Example contains an evaluation of the clarity in water of the soy protein isolate produced by the method of Example 1 (S700).

The clarity of the 1% w/v protein solutions prepared as described in Example 3 was assessed by measuring the absorbance at 600 nm, with a lower absorbance score indicating greater clarity. Analysis of the samples on the HunterLab ColorQuest XE instrument in transmission mode also provided a percentage haze reading, another measure of clarity.

The clarity results are set forth in the following Tables 7 and 8:

TABLE 7

Clarity of S700 solution at different pH values as assessed by A600

| | | A600 | | | | | | |
|---|---|---|---|---|---|---|---|---|
| Batch | Product | pH 2 | pH 3 | pH 4 | pH 5 | pH 6 | pH 7 | Nat. pH |
| S005-A19-09A | S700 | 0.007 | 0.015 | 0.035 | >3.0 | >3.0 | 2.219 | 0.014 |

TABLE 8

Clarity of S700 solution at different pH values as assessed by HunterLab analysis

| | | HunterLab haze reading (%) | | | | | | |
|---|---|---|---|---|---|---|---|---|
| Batch | Product | pH 2 | pH 3 | pH 4 | pH 5 | pH 6 | pH 7 | Nat. pH |
| S005-A19-09A | S700 | 0.0 | 0.0 | 0.0 | 90.6 | 90.4 | 90.1 | 0.0 |

As can be seen from the results of Tables 7 and 8, solutions of S700 were transparent in the pH range of 2 to 4.

Example 5

This Example contains an evaluation of the solubility in a soft drink (Sprite) and sports drink (Orange Gatorade) of the soy protein isolate produced by the method of Example 1 (S700). The solubility was determined with the protein added to the beverages with no pH correction and again with the pH of the protein fortified beverages adjusted to the level of the original beverages.

When the solubility was assessed with no pH correction, a sufficient amount of protein powder to supply 1 g of protein was weighed into a beaker and a small amount of beverage was added and stirred until a smooth paste formed. Additional beverage was added to bring the volume to 50 ml, and then the solutions were stirred slowly on a magnetic stirrer for 60 minutes to yield a 2% protein w/v dispersion. The protein content of the samples was analyzed using a LECO FP528 Nitrogen Determinator then an aliquot of the protein containing beverages was centrifuged at 7800 g for 10 minutes and the protein content of the supernatant measured.

Solubility (%)=(% protein in supernatant/% protein in initial dispersion)×100

When the solubility was assessed with pH correction, the pH of the soft drink (Sprite) (3.39) and sports drink (Orange Gatorade) (3.19) without protein was measured. A sufficient amount of protein powder to supply 1 g of protein was weighed into a beaker and a small amount of beverage was added and stirred until a smooth paste formed. Additional beverage was added to bring the volume to approximately 45 ml, and then the solutions were stirred slowly on a magnetic stirrer for 60 minutes. The pH of the protein containing beverages was measured and then adjusted to the original no-protein pH with HCl or NaOH as necessary. The total volume of each solution was then brought to 50 ml with additional beverage, yielding a 2% protein w/v dispersion. The protein content of the samples was analyzed using a LECO FP528 Nitrogen Determinator then an aliquot of the protein containing beverages was centrifuged at 7800 g for 10 minutes and the protein content of the supernatant measured.

Solubility (%)=(% protein in supernatant/% protein in initial dispersion)×100

The results obtained are set forth in the following Table 9:

TABLE 9

Solubility of S700 in Sprite and Orange Gatorade

| | | no pH correction | | pH correction | |
|---|---|---|---|---|---|
| Batch | Product | Solubility (%) in Sprite | Solubility (%) in Orange Gatorade | Solubility (%) in Sprite | Solubility (%) in Orange Gatorade |
| S005-A19-09A | S700 | 95.9 | 100 | 92.9 | 100 |

As can be seen from the results of Table 9, S700 was highly soluble in the Sprite and the Orange Gatorade. As S700 is an acidified product, protein addition had little effect on beverage pH.

Example 6

This Example contains an evaluation of the clarity in a soft drink and sports drink of the soy protein isolate produced by the method of Example 1 (S700).

The clarity of the 2% w/v protein dispersions prepared in soft drink (Sprite) and sports drink (Orange Gatorade) in Example 5 were assessed using the methods described in Example 4. For the absorbance measurements at 600 nm, the spectrophotometer was blanked with the appropriate beverage before the measurement was performed.

The results obtained are set forth in the following Tables 10 and 11:

TABLE 10

Clarity (A600) of S700 in Sprite and Orange Gatorade

| | | no pH correction | | pH correction | |
|---|---|---|---|---|---|
| Batch | Product | A600 in Sprite | A600 in Orange Gatorade | A600 in Sprite | A600 in Orange Gatorade |
| S005-A19-09A | S700 | 0.028 | 0.000 | 0.021 | 0.000 |

TABLE 11

Hunter Lab haze readings for S700 in Sprite and Orange Gatorade

| | | no pH correction | | pH correction | |
|---|---|---|---|---|---|
| Batch | Product | haze (%) in Sprite | haze (%) in Orange Gatorade | haze (%) in Sprite | haze (%) in Orange Gatorade |
| no protein | | 0.0 | 44.0 | 0.0 | 44.0 |
| S005-A19-09A | S700 | 1.6 | 51.7 | 0.0 | 41.1 |

As can be seen from the results of Tables 10 and 11, the S700 had essentially no effect on the clarity of the Sprite or the Orange Gatorade.

SUMMARY OF THE DISCLOSURE

In summary of this disclosure, the present invention provides a novel procedure for forming a soy protein product that is soluble in acidic media and forms heat stable and transparent solutions therein. Modifications are possible within the scope of this invention.

What we claim is:

1. A method of producing a soy protein product with a protein content of at least about 60 wt % (N×6.25) d.b., which comprises:
    (a) extracting a soy protein source with an aqueous salt solution, optionally containing an antioxidant, at a temperature of at least about 1° C. to cause solubilization of soy protein in the soy protein source and to form an aqueous protein solution having a protein content of about 5 to about 50 g/L and a pH of about 1.5 to about 11,
    (b) separating the aqueous protein solution from residual soy protein source,
    (c) optionally treating the aqueous protein solution with an adsorbent to remove colour and/or odour compounds from the aqueous protein solution,
    (d) adding calcium salt solution to the aqueous protein solution to a conductivity of about 15 to about 85 mS to cause a precipitate to form in the aqueous protein solution,
    (e) removing the precipitate from the aqueous soy protein solution,
    (f) increasing the protein concentration of the soy protein solution to about 50 to about 400 g/L, while maintaining the ionic strength substantially constant by using a selective membrane technique, to provide a concentrated protein solution,
    (g) optionally diafiltering the concentrated protein solution before or after complete concentration thereof, using from about 2 to about 40 volumes of diafiltration solution,
    (h) optionally pasteurizing the concentrated and optionally diafiltered protein solution at a temperature of about 55° to about 70° C. for about 30 seconds to about 60 minutes, followed optionally by cooling to a temperature of about 20° C. to about 35° C.,
    (i) diluting the concentrated and optionally diafiltered protein solution into about 2 to about 20 volumes of water having a temperature of about 2° to about 90° C.,
    (j) acidifying the resulting solution to a pH of about 1.5 to about 4.4 to produce an acidified clear protein solution,
    (k) optionally polishing the acidified clear protein solution,
    (l) increasing the concentration of the acidified clear protein solution to about 50 to about 300 g/L while maintaining the ionic strength substantially constant by using a selective membrane technique to provide a second concentrated protein solution,
    (m) optionally diafiltering the second concentrated protein solution before or after complete concentration thereof using from about 2 to about 40 volumes of diafiltration solution,
    (n) optionally treating the second concentrated and optionally diafiltered protein solution with an adsorbent to remove colour and/or odour compounds, and
    (o) optionally drying the second concentrated and optionally diafiltered protein solution to provide a soy protein product having a protein content of at least about 60 wt % (N×6.25) d.b.

2. A method of producing a soy protein product with a protein content of at least about 60 wt % (N×6.25) d.b., which comprises:
    (a) extracting a soy protein source with an aqueous salt solution, optionally containing an antioxidant, at a temperature of at least about 1° C. to cause solubilization of soy protein in the soy protein source and to form an aqueous protein solution having a protein content of about 5 to about 50 g/L and a pH of about 1.5 to about 11,
    (b) separating the aqueous protein solution from residual soy protein source, (c) optionally treating the aqueous protein solution with an adsorbent to remove colour and/or odour compounds from the aqueous protein solution,
(d) adding calcium salt solution to the aqueous protein solution to a conductivity of about 15 to about 85 mS to cause a precipitate to form in the aqueous protein solution,
(e) removing the precipitate from the aqueous soy protein solution,
(f) partially concentrating the aqueous protein solution to a protein concentration of about 50 g/L or less, while maintaining the ionic strength substantially constant by using a selective membrane technique,
(g) optionally diafiltering the partially concentrated protein solution, preferably using an aqueous salt solution of the same molarity and pH as the extraction solution, before or after partial concentration thereof using from about 2 to about 40 volumes of diafiltration solution,
(h) diluting the partially concentrated and optionally diafiltered protein solution into about 0.5 to about 20 volumes of water having a temperature of about 2° to about 90° C.,
(i) acidifying the resulting solution to a pH of about 1.5 to about 4.4 to produce an acidified clear protein solution.
(j) optionally polishing the acidified clear protein solution,
(k) increasing the concentration of the acidified clear protein solution to about 50 to about 300 g/L, while maintaining the ionic strength substantially constant by using a selective membrane technique to provide a concentrated protein solution,
(l) optionally diafiltering the concentrated protein solution, preferably using water or dilute saline solution, before or after complete concentration thereof using from about 2 to about 40 volumes of diafiltration solution,
(m) optionally treating the concentrated and optionally diafiltered protein solution with an adsorbent to remove colour and/or odour compounds, and
(n) optionally pasteurizing the concentrated and optionally diafiltered protein solution at a temperature of about 55° to about 70° C. for about 30 seconds to about 60 minutes, followed optionally by cooling to a temperature of about 20° C. to about 35° C., and
(o) optionally drying the concentrated and optionally diafiltered protein solution to provide a soy protein product having a protein content of at least about 60 wt % (N×6.25) d.b.

3. A method of producing a soy protein product with a protein content of at least about 60 wt % (N×6.25) d.b., which comprises:
(a) extracting a soy protein source with an aqueous salt solution, preferably aqueous sodium chloride solution, optionally containing an antioxidant, at a temperature of at least about 1° C. to cause solubilization of soy protein in the soy protein source and to form an aqueous protein solution having a protein content of about 5 to about 50 g/L and a pH of about 1.5 to about 11,
(b) separating the aqueous protein solution from residual soy protein source,
(c) optionally treating the aqueous protein solution with an adsorbent to remove colour and/or odour compounds from the aqueous protein solution,
(d) partially concentrating the aqueous protein solution to about 50 g/L or less while maintaining the ionic strength substantially constant by using a selective membrane technique to provide a partially concentrated protein solution,
(e) optionally diafiltering the partially concentrated protein solution, before or after partial concentration thereof using from about 2 to about 40 volumes of diafiltration solution,
(f) adding calcium salt solution to the partially concentrated protein solution to a conductivity of about 15 to about 85 mS to cause a precipitate to form in the partially concentrated protein solution,
(g) removing the precipitate from the partially concentrated protein solution,
(h) further increasing the protein concentration of the partially concentrated protein solution to about 50 to about 400 g/L while maintaining the ionic strength substantially constant by using a selective membrane technique to provide a concentrated protein solution,
(i) optionally diafiltering the concentrated protein solution, preferably using an aqueous salt solution of the same molarity and pH as the extraction solution, before or after complete concentration thereof using from about 2 to about 40 volumes of diafiltration solution,
(j) optionally pasteurizing the concentrated and optionally diafiltered protein solution at a temperature of about 55° to about 70° C. for about 30 seconds to about 60 minutes, followed optionally by cooling to a temperature of about 20° C. to about 35° C.,
(k) diluting the clarified retentate into about 2 to about 20 volumes of water, having a temperature of about to about 90° C.,
(l) acidifying the resulting solution to a pH of about 1.5 to about 4.4 to produce an acidified clear protein solution,
(m) optionally polishing the acidified clear protein solution,
(n) increasing the concentration of the acidified clear protein solution to a protein concentration of about 50 to about 300 g/L, while maintaining the ionic strength substantially constant by using a selective membrane technique, cut-off of about 3,000 to about 1,000,000 Daltons to provide a second concentrated protein solution,
(o) optionally diafiltering the second concentrated protein solution, before or after complete concentration thereof using from about 2 to about 40 volumes of diafiltration solution,
(p) optionally treating the second concentrated and optionally diafiltered protein solution with an adsorbent to remove colour and/or odour compounds, and
(q) optionally drying the second concentrated and optionally diafiltered protein solution to provide a soy protein product having a protein content of at least about 60 wt % (N×6.25) d.b.

4. The method of any one of claims 1, 2 and 3 wherein at least one of said concentration steps and/or at least one of the optional diafiltration steps are operated in a manner favourable to the removal of trypsin inhibitors.

5. The method of any one of claims 1, 2 and 3 wherein said concentration and optional diafiltration steps are carried out at a temperature of about 2 to about 60° C.

6. The method of any one of claims 1, 2 and 3 wherein a reducing agent is present or added to disrupt or rearrange the disulfide bonds of trypsin inhibitors to achieve a reduction in trypsin inhibitor activity during the extraction step and/or during the concentration steps and optional diafiltration steps and/or prior to drying and/or the dried soy protein product.

7. The method of any one of claims 1, 2 and 3 wherein said acidified soy protein solution, said partially concentrated soy protein solution and/or said concentrated soy protein solution, is subjected to a heat treatment, to inactivate heat labile anti-nutritional factors, including heat-labile trypsin inhibitors, said heat treatment being effected at a temperature of about 70° to about 160° C. for about 10 seconds to about 60 minutes, the heat treated soy protein solution optionally thereafter being cooled to a temperature of about 2° to about 60° C. for further processing.

8. The method of any one of claims 1, 2 and 3 wherein the soy protein product has a protein content of at least about 90 wt %.

9. The method of any one of claims 1, 2 and 3 wherein the soy protein product has a protein content of at least about 100 wt %.

10. The method of any one of claims 1, 2 and 3 wherein said aqueous salt solution is sodium chloride solution.

11. The method of any one of claims 1, 2 and 3 wherein said extraction step is effected at a temperature of about 15° to about 35° C. to form an aqueous solution having a protein content of about 10 to about 50 g/L and a pH of about 5 to about 7.

12. The method of claim 1 or 2 wherein the calcium salt solution is calcium chloride solution and is added to the aqueous protein solution to a conductivity of about 17 to about 25 mS.

13. The method of claim 1 wherein the protein concentration of the soy protein solution is increased to about 100 to about 250 g/L employing a membrane having a molecular weight cut-off of about 3,000 to about 1,000,000 Daltons.

14. The method of claim 13 wherein the molecular weight cut-off is about 5,000 to about 100,000 Daltons.

15. The method of claim 1 wherein the concentrated protein solution is diafiltered using a salt solution of the same molarity and pH of the extraction solution using from about 2 to about 40 volumes of diafiltration solution using a membrane having a molecular weight cut-off of about 3,000 to about 1,000,000 Daltons.

16. The method of claim 15 wherein about 5 to about 25 volumes of diafiltration solution is used with an antioxidant present during at least part of the diafiltration step and the membrane has a molecular weight cut-off of about 5,000 to about 100,000 Daltons.

17. The method of claim 15 wherein said diafiltration step is effected until no significant further quantities of contaminants or visible colour are present in the permeate.

18. The method of claim 1 wherein said pasteurization step is effected at a temperature of about 60° to about 65° C. for about 10 to about 15 minutes.

19. The method of claim 1 wherein the concentrated and optionally diafiltered protein solution is diluted into about 10 to about 15 volumes of water having a temperature of about 10° to about 50° C.

20. The method of claim 19 wherein the temperature is about 20° to about 30° C.

21. The method of claim 1 wherein the acidifying step is effected to a pH of about 2.0 to about 4.0.

22. The method of claim 1 wherein the protein concentration of the acidified clear protein solution is increased to about 100 to about 200 g/L using a membrane having a molecular weight cut-off of about 3,000 to about 1,000,000 Daltons.

23. The method of claim 22 wherein the molecular weight cut-off is about 5,000 to about 100,000 Daltons.

24. The method of claim 1 wherein the second concentrated protein solution is diafiltered using water or dilute saline solution using from about 2 to about 40 volumes of diafiltration solution using a membrane having a molecular weight cut-off of about 3,000 to about 1,000,000 Daltons.

25. The method of claim 24 wherein about 5 to about 25 volumes of diafiltration solution are used with an antioxidant present during at least part of the diafiltration step and the membrane has a molecular weight cut-off of about 5,000 to about 100,000 Daltons.

26. The method of claim 25 wherein the diafiltered is effected until no significant further quantities of contaminants or visible colour are present in the permeate.

27. The method of claim 2 or 3 wherein the partially concentrated protein solution is effected using a membrane having a molecular weight cut-off of about 3,000 to about 1,000,000 Daltons.

28. The method of claim 27 wherein the membrane has a molecular weight cut-off of about 5,000 to about 100,000 Daltons.

29. The method of claim 2 or 3 wherein the partially concentrated protein solution is diafiltered using an aqueous salt solution of the same molarity and pH as extraction solution using about 5 to about 25 volumes of diafiltration solution using a membrane having a molecular weight cut-off of about 3,000 to about 1,000,000 Daltons.

30. The method of claim 29 wherein said diafiltration is effected with an antioxidant present during at least part of the diafiltration step and the membrane by a molecular weight cut-off of about 5,000 to about 100,000 Daltons.

31. The method of claim 30 wherein said diafiltered is effected until no significant further quantities of contaminants or visible colour are present in the permeate.

32. The method of claim 2 wherein the partially concentrated and optionally diafiltered protein solution is diluted into about 1 to about 10 volumes of water having a temperature of about 10° to about 50° C.

33. The method of claim 32 wherein said dilution is effected using about 2 to about 5 volumes of water having a temperature of about 20° to about 30° C.

34. The method of claim 2 wherein the acidifying step is effected to a pH of about 2.0 to about 4.0.

35. The method of claim 2 wherein the acidified clear protein solution is concentrated to about 100 to about 200 g/L using a membrane having a molecular weight cut-off of about 3,000 to about 1,000,000 Daltons.

36. The method of claim 35 wherein the membrane has a molecular weight cut-off of about 5,000 to about 100,000 Daltons.

37. The method of claim 2 or 3 wherein the concentrated protein solution is diafiltered using water or dilute saline solution having 5 to about 25 volumes of diafiltration solution using a membrane having a molecular weight cut-off of about 3,000 to about 1,000,000 Daltons.

38. The method of claim 37 wherein the diafiltration is effected with an antioxidant present during at least part of the diafiltration step using a membrane having a molecular weight cut-off of about 5,000 to about 100,000 Daltons.

39. The method of claim 38 wherein the diafiltration is effected until no significant further quantities of contaminants or visible colour are present in the permeate.

40. The method of claim 2 or 3 wherein the concentrated and optionally diafiltered solution is pasteurized at a temperature of about 60° to about 65° C. for about 10 to about 15 minutes.

41. The method of claim 3, wherein the calcium salt solution is calcium chloride and is added to partially concentrated protein solution to a conductivity of about 17 to about 25 mS.

42. The method of claim 3 wherein the concentration of the partially concentrated protein solution is further increased to about 100 to about 250 g/L.

43. The method of claim 42 wherein the further concentration is effected using a membrane having a molecular weight cut-off of about 3,000 to about 1,000,000 Daltons.

44. The method of claim 43 wherein the molecular weight cut-off is about 5,000 to about 100,000 Daltons.

45. The method of claim 3 wherein the clarified retentate is diluted into about 10 to about 15 volumes of water having a temperature of about 10° to about 50° C.

46. The method of claim 45 wherein the temperature is about 20° to about 30° C.

47. The method of claim 3 wherein the acidification step is to a pH of about 2 to about 4.0.

48. The method of claim 3 wherein the acidified clear protein solution is concentrated to a concentration of about 100 to about 200 g/L.

49. The method of claim 48 wherein said selective membrane technique is effected using a membrane having a molecular weight cut-off of about 3,000 to about 1,000,000 Daltons.

50. The method of claim 49 wherein the molecular weight cut-off is about 5,000 to about 100,000 Daltons.

51. The method of claim 3 wherein the second concentrated protein solution is diafiltered using water or dilute saline solution using about 5 to about 25 volumes of diafiltration solution using a membrane with a molecular weight cut-off of about 3,000 to about 1,000,000 Daltons.

52. The method of claim 51 wherein said diafiltration is effected with an antioxidant present during at least part of the diafiltration step using a membrane with a molecular weight cut-off of about 5,000 to about 100,000 Daltons.

53. The method of claim 52 wherein said diafiltration is effected until no significant further quantities of contaminants or visible colour are present in the permeate.

54. The method of claim 5 wherein said temperature is about 20° to about 25° C.

55. The method of claim 7 wherein said heat treatment is effected at about 80° to about 120° C. to about 30 seconds to about 5 minutes.

56. The method of claim 7 wherein said heat treatment is effected at about 85° to about 95° C. for about 30 seconds to about 5 minutes.

57. The method of claim 55 wherein the heat treated soy protein solution is cooled to about 20° to about 35° C.

* * * * *